United States Patent [19]

Silvey

[11] 4,314,592

[45] Feb. 9, 1982

[54] TREE FELLING SYSTEM WITH CAM-OPERATED HYDRAULIC CHECK VALVE

[76] Inventor: Elmer R. Silvey, 1231 Dutton Rd., Eagle Point, Oreg. 97524

[21] Appl. No.: 108,666

[22] Filed: Dec. 31, 1979

[51] Int. Cl.$^3$ .................. B66F 3/24; A01G 23/08
[52] U.S. Cl. ..................... 144/34 A; 137/DIG. 2; 144/34 B; 144/309 AC; 254/93 R
[58] Field of Search .......... 137/DIG. 2, 523; 144/34 R, 34 A, 34 B, 309 AC; 254/93 R, 93 H, 93 HP, 104

[56] References Cited

U.S. PATENT DOCUMENTS

| | | | |
|---|---|---|---|
| 1,675,979 | 7/1928 | Laird | 137/DIG. 2 |
| 2,196,503 | 4/1940 | McFee | 137/DIG. 2 |
| 2,366,693 | 1/1945 | Benaway | 137/DIG. 2 |
| 2,690,323 | 9/1954 | Evenson | 254/104 |
| 3,774,504 | 11/1973 | Bonney | 137/DIG. 2 |
| 3,945,610 | 3/1976 | Solie et al. | 144/34 A |
| 4,008,878 | 2/1977 | Himmelman | 137/DIG. 2 |

Primary Examiner—W. D. Bray
Attorney, Agent, or Firm—Klarquist, Sparkman, Campbell, Leigh, Whinston & Dellett

[57] ABSTRACT

A hydraulic network interconnects a pump with one or more hydraulic jacks, the jacks being arranged at the ends of parallel segments of the hydraulic network, each segment including a safety check valve for isolating the respective jack of such segment from the remaining portions of the hydraulic network including the pump. The jack or jacks in the system are installed in the backcut of a tree so that forceably extending the ram of each such jack will cause the tree to be felled in the desired direction. Each safety check valve includes a camming surface which can be manually positioned in the absence of a substantial load on the respective jack to override the normal automatic operation of the valve thereby maintaining the valve open to allow fluid to return from the respective jack through the valve when it is desired to collapse the jack after the tree has been felled.

2 Claims, 5 Drawing Figures

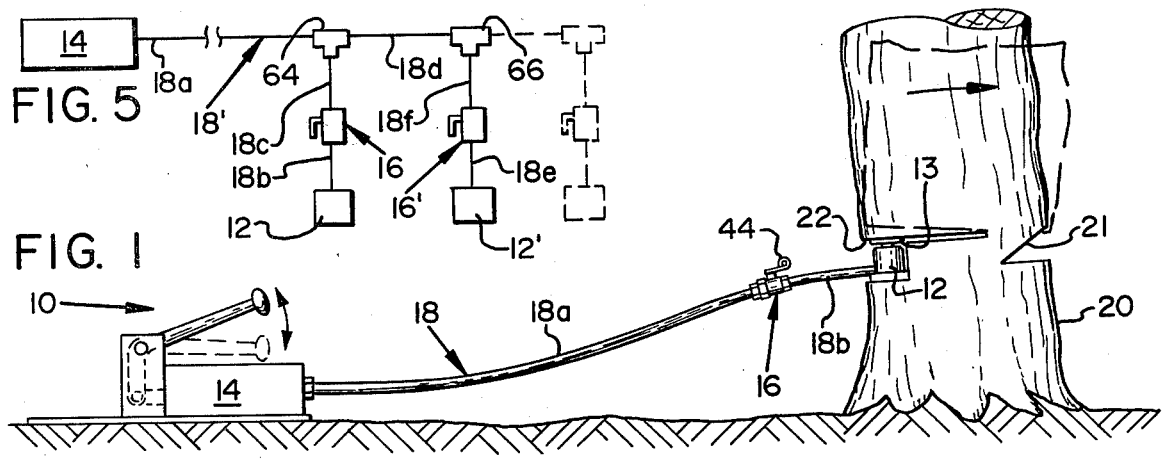
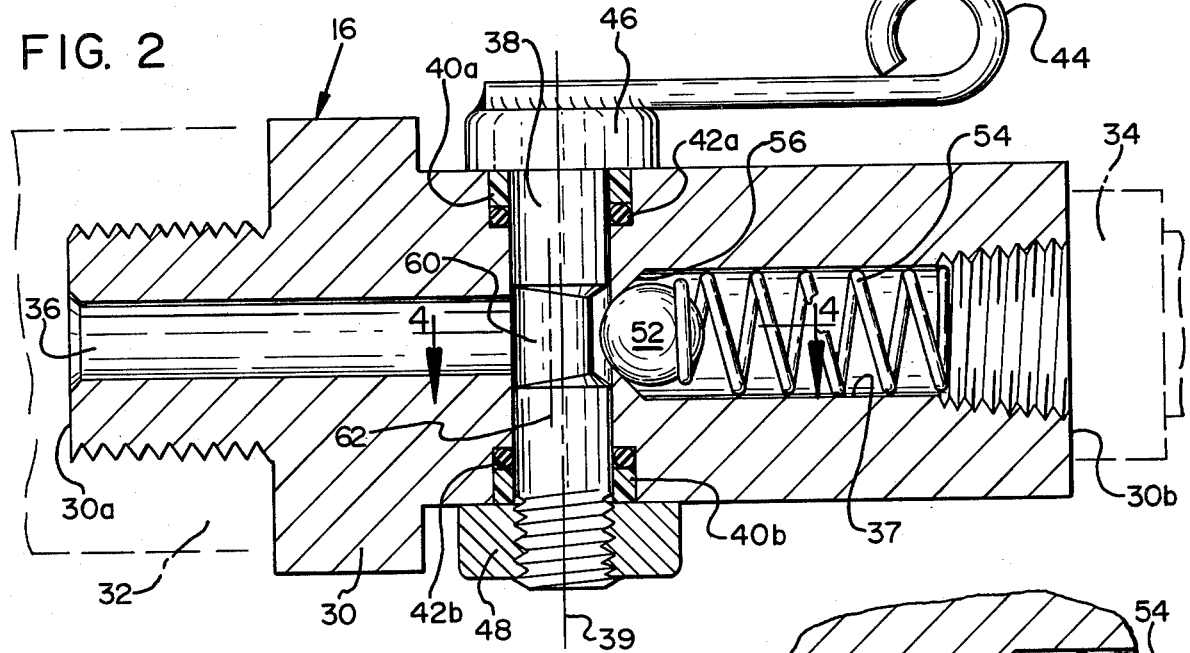
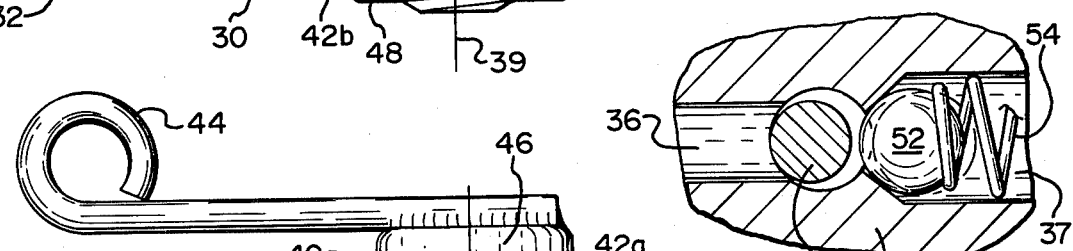
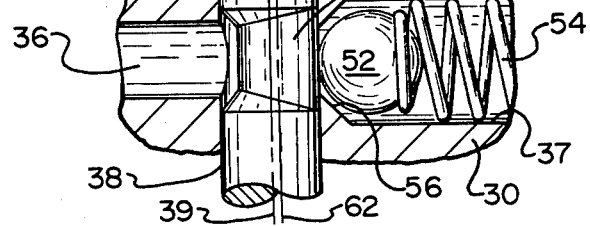

TREE FELLING SYSTEM WITH CAM-OPERATED HYDRAULIC CHECK VALVE

BACKGROUND OF THE INVENTION

The present invention pertains to hydraulic jack systems used in felling trees and an improved safety check valve having application to such systems.

It has been a practice in the prior art to employ hydraulic jacks in a backcut of a tree to assist in felling the tree in a desired direction. Those skilled in the art will appreciate that such hydraulic jacks many times provide the only practical technique for felling a tree in a desired direction, particularly when the tree is leaning away from the desired direction. Hydraulic jack systems employed in the prior art have heretofore not provided a convenient method for adding hydraulic jacks as needed to the system while one or more previously activated jacks remain in load supporting relationship in the backcut of a tree. Furthermore, such systems have either been characterized by inadequate safety provisions or failed to provide an efficient means for collapsing the jacks after the tree has been felled.

In one such prior art system, each jack is isolated from the remaining portions of the hydraulic network by means of a check valve which is shunted by a manually operable needle valve. When the needle valve is closed, the check valve is operable to permit the jack to be pumped up to its peak working pressure and maintained at such pressure to continue supporting the load of a tree in the event of a loss of pressure on the pump side of the valve. Once the tree has been felled, the jack can be collapsed by merely opening the needle valve to drain the hydraulic fluid from the jack around the check valve.

One disadvantage with such a prior art system is the likelihood of accidentally opening the needle valve while a tree is being supported by a jack thus causing the jack to collapse and the tree to fall backward in the wrong direction with consequent injuries and property damage. Accordingly, it would be desirable to provide a tree-felling system in which it is not possible to inadvertently bypass a safety check valve while the hydraulic jack is in load supporting relationship with the tree.

Another disadvantage with such a prior art system is that needle valves are relatively time consuming devices to operate in that they require at least several complete turns in order to open the valve fully from a closed position. Accordingly, it would be desirable to provide a more efficient mechanism for quickly collapsing the jacks in a treefelling system after the tree has been felled.

SUMMARY OF THE INVENTION

The foregoing disadvantages and other problems of the prior art are solved in accordance with the present invention by providing a safety check valve having an automatic mode of operation in which the valve responds to pressure differentials so that the valve will open with each positive stroke of a hydraulic pump on one side of the valve and otherwise remain closed to maintain the hydraulic pressure in a jack on the other side of the valve, and having an override mode of operation in which a manually positionable camming surface forces a valve member away from its seat in order to maintain the valve open to fluid flow independently of the pressures acting on the valve. The camming surface is rotatable with a valve stem by means of a handle by which a rotation of less than one full turn will permit switching of the valve fom the automatic mode to the override mode. The handle, valve stem and camming surface are adapted so that the operator cannot manually rotate the valve stem to the override position whenever the pressure on the jack-side of the valve significantly exceeds the pressure on the pumpside of the valve.

It will therefore be appreciated that a principal advantage of the invention over prior art systems is that the automatic operation of the safety check valve cannot be inadvertently overridden when the danger exists of collapsing a jack which is in hydraulic series relationship with the valve and has its ram extended in load supporting relationship in the backcut of a tree.

The presently preferred way of carrying out the invention is described in detail below with reference to the accompanying drawing.

BRIEF DESCRIPTION OF THE DRAWINGS

FIG. 1 is a schematic elevational view of a first embodiment of a tree felling system in accordance with the present invention;

FIG. 2 is a vertical cross section of a safety check valve in accordance with the present invention wherein a valve stem is oriented for operation of the valve in a first mode;

FIG. 3 is a fragmentary cross section similar to FIG. 2 but with the valve stem oriented for operation of the valve in a second mode;

FIG. 4 is a fragmentary cross section taken along line 4—4 of FIG. 2; and

FIG. 5 is a diagrammatic illustration of a second tree-felling system in accordance with the present invention.

DESCRIPTION OF THE PREFERRED EMBODIMENT

Referring now to the drawing, a preferred embodiment of the invention and an important application thereof will be described, like reference numerals designating the same parts in the various figures.

With particular reference to FIG. 1, a tree-felling system in accordance with the present invention is schematically illustrated and designated generally by reference numeral 10. The system 10 includes at least one hydraulic jack 12 having an extendable ram 13 actuatable in response to the operation of a remote pump 14, each such jack 12 being in fluid communication with a safety check valve 16 disposed between the jack 12 and pump 14. A hydraulic network, designated generally by reference numeral 18, interconnects each such jack 12 and associated check valve 16 with the pump 14. In the example of FIG. 1, only one jack 12 is specifically illustrated. A multiple jack embodiment of the system will be described below with reference to FIG. 5. In the single jack embodiment of FIG. 1, the hydraulic network 18 simply consists of a main line 18a leading from the pump 14 to valve 16 and a feeder line 18b leading from the valve 16 to the jack 12.

A tree 20 to be felled in accordance with the inventive system 10 is provided with an undercut 21 and a backcut 22 in the conventional manner. The jack 12 is mounted in engagement with the top and bottom surfaces of the backcut 22. For best results, the check valve 16 is disposed proximate to the jack 12 in order to minimize the risk of line failure on the load side of the valve 16. The feeder line 18b is therefore made as short as possible, preferably measuring about one foot.

A preferred hydraulic jack 12 for the system 10 is disclosed in my U.S. Pat. No. 4,119,298. The pump 14 may comprise any suitable hydraulic pump means, such as the hand-operated pump disclosed in my U.S. Pat. No. 4,026,524. The preferred pump 14 is pressure limited to provide a maximum hydraulic pressure equal to the peak working pressure of the jack 12.

Now referring to FIGS. 2-4, the details of a presently preferred embodiment of the safety check valve 16 will now be described. With particular reference to FIG. 2, the valve 16 is characterized by a housing 30 having an inlet end 30a and an outlet end 30b, which are adapted to be secured in a fluid-tight manner in the hydraulic network 18 (see FIG. 1) by means of threaded connectors 32 and 34, respectively. The housing 30 includes two longitudinally aligned internal passageways 36 and 37 which are separated by a transversely oriented valve stem 38. The valve stem 38 is generally cylindrical in shape with a principal axis indicated by reference numeral 39. Surrounding the opposite ends of the valve stem 38 are bearing rings 40a and 40b and inward therefrom are O-ring seals 42a and 42b, the rings and seals being disposed in annular cavities within the housing 30. The bearing rings 40a and 40b preferably comprise a relatively noncompressible material having a relatively low coefficient of friction against the surfaces of the valve stem 38. A suitable material for the rings 40a and 40b is nylon and the valve stem 38 preferably comprises steel. The valve stem 38 is rotatable about its cylindrical axis 39 by means of a manually operable handle 44. The handle 44 includes an annular collar 46 abutting the portion of the external wall of the housing 30 that surrounds the ring 40a. The valve stem 38 is secured against axial movement by suitable means, such as a hex nut 48 threadedly connected to the end of the valve stem 38 opposite from the handle 44. The nut 48 slidably abuts the portion of the external wall of the housing 30 that surrounds the ring 40b.

It will be appreciated that the passageway 37 defines a valve chamber within which a valve member or ball 52 is operable. The passageway or valve chamber 37 is conveniently made cylindrical in shape for transversely confining a helical spring 54, which resiliently urges the ball 52 to the left in the views of FIGS. 2-4. When the handle 44 is positioned as shown in FIG. 2, the valve 16 is operable in an automatic mode wherein the spring 54 biases the ball 52 to a normally closed position until the pressure in the fluid at the inlet end 30a exceeds the pressure in the fluid at the outlet end 30b by an amount exceeding the force of the spring 54. FIG. 4 shows the position assumed by the ball 52 in phantom lines when the valve 16 is open in response to such a pressure differential. In the normally closed position seen in FIG. 2, the ball 52 rests against a valve seat 56 formed by an inwardly tapering wall portion of the chamber 37. When the handle 44 is positioned as shown in FIG. 3, the valve 16 is operable in an override mode, the unique features and purposes of which will presently be described.

In accordance with an important feature of the invention, the valve stem 38 includes a middle cylindrical portion 60 having a smaller diameter than the remaining portion of the valve stem 38, as will be appreciated best from the view of FIG. 4. The middle portion 60 has a cylindrical axis 62 which is offset relative to the principal axis 39 of the valve stem 38 such that the middle portion 60 acts as a cam to force the ball 52 from the valve 56 when the valve stem 38 is rotated to the position shown in FIG. 3. In this so-called override position, the valve 16 will remain open to the flow of fluid in either direction regardless of the pressure differential across the valve 16 since the ball 52 is forced into an open position by the middle portion 60 of the valve stem 38 in the manner illustrated in FIG. 3.

The operation of the valve 16 in the tree-felling system 10 will now be described with initial reference to FIG. 1. First, the tree 20 is prepared by making the undercut 21 and backcut 22 in the usual manner and then the jack 12 is installed in the backcut 22 in the indicated manner. The check valve 16 is preset in the automatic position as seen in FIG. 2. The pump 14 is then manually reciprocated to extend the ram 13 of the jack 12 thereby gradually tilting the tree 20 as indicated in phantom lines in FIG. 1, eventually causing the tree 20 to be felled in the desired direction. During this procedure, the ball 52 is forced away from the valve seat 56 to allow fluid to pass through the valve 16 with each positive stroke of the pump 14. Should the pump 14 at any time fail and thereby cause a sudden loss of pressure in the hydraulic network 18, or should a leak occur in the main hydraulic line 18a, the valve 16 will close automatically in response to the resulting pressure differential. Thus, the operation of the valve 16 in the automatic mode assures that pressure losses of the aforementioned type will not cause the ram 13 to collapse and allow the tree 20 to fall back in the wrong direction.

Once the tree 20 has been felled, the valve 16 can be set in the override position shown in FIG. 3 to facilitate manually collapsing the ram 13 back into the jack 12. Unlike prior-art needle valves, opening of the valve 16 is quickly achieved by rotating the handle 44 one-half turn (180 degrees).

It will be appreciated than an important safety feature of the valve 16 is that it cannot be switched from the automatic mode to the override mode when the jack 12 is in a load supporting relationship with the tree 20 since the pressure of the load will seat the valve member 52 closed with such force that it can not be manually unseated by rotating the valve stem 38 manually. It is preferred that the jack 12 employed in the system 10 have a peak working pressure of about 10,000 pounds per square inch (psi) and a maximum pressure capability of about 20,000 psi. The check valve 16 herein described has been found capable of withstanding at least a 20,000 psi test pressure. It will be appreciated that the handle 44 cannot be manually moved from the position shown in FIG. 2 to the position shown in FIG. 3 when pressures in the range of 10,000 psi exist in the valve chamber 37. Accordingly, it is not possible to accidentally open the valve 16 when the jack 12 is supporting a substantial tree load.

FIG. 5 schematically illustrates an alternate embodiment of the inventive tree-felling system, wherein the hydraulic network is designated generally by reference numeral 18'. By way of example, a second segment of a hydraulic network having a second hydraulic jack 12' and an associated check valve 16', is connected in parallel with the first network segment comprising the similar jack 12 and valve 16 combination by means quick-connect couplings 64 and 66 installed in the network 18' using known coupling techniques. Each of the couplings 64 and 66 has three normally closed sockets adapted to mate with a male connector (not shown) at the end of a hydraulic line. Thus, coupling 64 interconnects the main hydraulic line 18a with jumper lines 18c and 18d which respectively lead to the first check valve 16 and the second coupling 66. The coupling 66 feeds the second jack 12' via its associated check valve 16' and has a socket for feeding additional jacks through similar couplings as depicted in phantom. It will be appreciated that any suitable number of jacks may be employed depending on the size and angle of inclination of the tree to be felled. In actual practice, as many as seven such jacks have been employed effectively in the backcut of a single tree.

The operation of the tree-felling system of FIG. 5 is similar in many respects to the operation of the single jack system previously described. It will be appreciated that the use of a check valve between each jack and coupling pair facilitates additional jacks to the system while a tree is being lifted. Assume, for example, that only one jack were used in the back cut of a tree as depicted in FIG. 1 and it became apparent that an additional jack would be required to fell the tree. Using the hydraulic network 18' depicted in FIG. 5, the following procedure would be undertaken. With the first jack 12 in load supporting relationship in the backcut of a tree and the valve 16 preset in the automatic position, the pump 14 is de-activated so that the hydraulic pressure in the line 18a is reduced to atmospheric or nominal pressure. The couplings 64 and 66 are then interconnected as shown in FIG. 5 using the hydraulic lines 18a, 18c and 18d. The coupling 66 is connected to the jack 12' through the check valve 16' via hydraulic lines 18e and 18f as shown. With the valve 16' preset in the automatic position, the jack 12' is then inserted adjacent to the previously installed jack 12 in the backcut of the tree, which is then still being supported by the jack 12. The pump 14 is then re-activated to raise the pressure in the hydraulic network 18' to its full working pressure level, thereby causing the ram of the jack 12' to be extended forcefully against the adjacent surface in the backcut of the tree.

From the foregoing description of the check valve 16 and two hydraulic circuit applications thereof, it will be apparent that the invention effectively solves the aforementioned problems of the prior art. Although the inventive check valve 16 has been described in the context of its application in tree-felling systems, it will be appreciated that the check valve 1 can have many other useful applications. For example, the valve 16 can also be employed as a flow restrictor in a hydraulic circuit by rotating the handle 44 to various selected positions between the two positions shown in FIGS. 2 and 3 in order to vary the minimum separation between the valve member 52 and the valve seat 56. Having the benefit of the presently disclosed invention, numerous other alternative embodiments which are within the spirit and scope of the appended claims will be suggested to those skilled in the art.

What is claimed is:

1. In a tree-felling system including a hydraulic network having a plurality of circuit segments each having a first end and a second end, the first ends of the circuit segments being connected to a common hydraulic line, the second end of each circuit segment being operably connected to a hydraulic jack, a check valve disposed in each circuit segment between the common line and hydraulic jack, a pump connected to the common line for activating the hydraulic jacks, each hydraulic jack having a ram extendable to lift a load in response to the pressure in the portion of the hydraulic circuit segment leading thereto, each check valve having manually positionable means permitting the valve to operate in an automatic mode in which the valve is resiliently biased normally closed and an override mode in which the valve is held open independently of the pressures acting on the opposite sides of the valve, the method of felling a tree comprising:
   providing an undercut on the side of the tree toward which the tree is intended to fall;
   providing a backcut on the side of the tree opposite from the undercut;
   installing the jack of a first circuit segment in the backcut;
   setting the check valve of the first circuit segment in the automatic position;
   activating the pump to raise the pressure in the first jack substantially to its peak working pressure;
   de-activating the pump to reduce the pressure in the portion of the hydraulic network between the pump and the first check valve substantially to atmospheric pressure while the first check valve automatically maintains the pressure in the portion of the hydraulic network between the first check valve and the first jack substantially at the peak working pressure of the jack;
   connecting at least a second hydraulic circuit segment in parallel with the first hydraulic circuit segment;
   setting the check valve in each additional circuit segment to the automatic position;
   re-activating the pump to raise the pressure in the hydraulic network thereby forceably extending the rams of each jack in the system to cause the tree to be felled; and
   setting the check valve in each additional circuit segment to the override position to open the check valves, thereby allowing the rams of each jack in the systems to be collapsed.

2. In a hydraulic tree-felling system having a hydraulic pump, a primary hydraulic line leading from said pump, and a plurality of hydraulic jacks connected in parallel to said primary line by secondary hydraulic lines, a hydraulic check valve disposed in each of said secondary lines between each of said jacks and said primary line comprising:
   a valve body defining outlet and inlet fluid passages in fluid communication with one another and a valve seat therebetween,
   said inlet passage being in fluid communication with said pump,
   said outlet passage being in fluid communication with one of said jacks,
   a valve stem journaled at its opposite ends in the housing for rotation on an axis and passing through the intersection of said passages, said stem being manually rotatable,
   wall means defining a valve seat within said outlet passage adjacent said valve stem,
   a valve member disposed in the outlet passage,
   resilient means resiliently urging said valve member toward said valve seat, and
   camming means defined by an intermediate portion of said valve stem and selectively rotatable with said stem to a position forcing said valve member away from said valve seat to hold the valve open to fluid flow through the passages independently of the relative pressures in the passages, said valve stem being rotatable to a second position such that said camming means is spaced apart from said valve member and said valve member is operable as a check valve to enable fluid flow under pressure from said pump to said one jack but prevent reverse fluid flow under pressure through said valve in a direction from said jack toward said pump.

* * * * *